US010567588B2

(12) United States Patent
Jang et al.

(10) Patent No.: US 10,567,588 B2
(45) Date of Patent: Feb. 18, 2020

(54) INTELLIGENT AGENT SYSTEM INCLUDING TERMINAL DEVICE AND CONTROL METHOD THEREFOR

(71) Applicant: LG ELECTRONICS INC., Seoul (KR)

(72) Inventors: Hyukjae Jang, Seoul (KR); Jieun Kim, Seoul (KR); Youngyeon Seo, Seoul (KR); Minho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 15/750,823

(22) PCT Filed: Sep. 9, 2015

(86) PCT No.: PCT/KR2015/009486
§ 371 (c)(1),
(2) Date: Feb. 6, 2018

(87) PCT Pub. No.: WO2017/026572
PCT Pub. Date: Feb. 16, 2017

(65) Prior Publication Data
US 2018/0249013 A1    Aug. 30, 2018

(30) Foreign Application Priority Data

Aug. 7, 2015 (KR) .................. 10-2015-0111442

(51) Int. Cl.
*H04M 3/54*      (2006.01)
*H04L 29/12*     (2006.01)
*H04L 29/08*     (2006.01)
(52) U.S. Cl.
CPC .......... *H04M 3/54* (2013.01); *H04L 61/1594* (2013.01); *H04L 67/24* (2013.01)

(58) Field of Classification Search
CPC ....... H04M 3/54; H04M 3/42; H04L 61/1594; H04L 67/24
See application file for complete search history.

(56) References Cited

U.S. PATENT DOCUMENTS

2010/0250592 A1   9/2010  Paquet et al.
2011/0250874 A1  10/2011  Shah et al.
(Continued)

FOREIGN PATENT DOCUMENTS

JP        2006229850      8/2006
KR     1020060078476      7/2006
(Continued)

OTHER PUBLICATIONS

European Patent Office Application Serial No. 15901054.5, Search Report dated Dec. 6, 2018, 9 pages.
(Continued)

*Primary Examiner* — Wei Zhao
(74) *Attorney, Agent, or Firm* — Lee, Hong, Degerman, Kang & Waimey

(57) ABSTRACT

An intelligent agent system including a terminal device and a control method therefor are disclosed. The terminal device includes: a display unit configured to display a contact list, a communication unit configured to request and receive state information of a user selected from the contact list and a control unit configured to control the communication unit to request and receive the state information in response to the selection of the user, wherein the control unit is configured to extract at least one of a plurality of methods available for connecting to the selected user based on the received state information, to control the display unit to display the extracted at least one connection method, to select one of the extracted connection method based on a predetermined (Continued)

criteria, and to control the communication unit to connect the selected user using the selected connection method.

20 Claims, 18 Drawing Sheets

(56) References Cited

U.S. PATENT DOCUMENTS

| | | | | |
|---|---|---|---|---|
| 2016/0357357 | A1* | 12/2016 | Lemay | G06F 3/0481 |
| 2017/0332359 | A1* | 11/2017 | Tsai | H04B 7/0617 |
| 2018/0309801 | A1* | 10/2018 | Rathod | H04L 51/04 |

FOREIGN PATENT DOCUMENTS

| | | |
|---|---|---|
| KR | 100763238 | 10/2007 |
| KR | 1020090038361 | 4/2009 |
| KR | 1020090046124 | 5/2009 |
| KR | 1020120003937 | 1/2012 |
| WO | 2006038962 | 4/2006 |

OTHER PUBLICATIONS

PCT International Application No. PCT/KR2015/009486, Written Opinion of the International Searching Authority dated May 3, 2016, 28 pages.

* cited by examiner

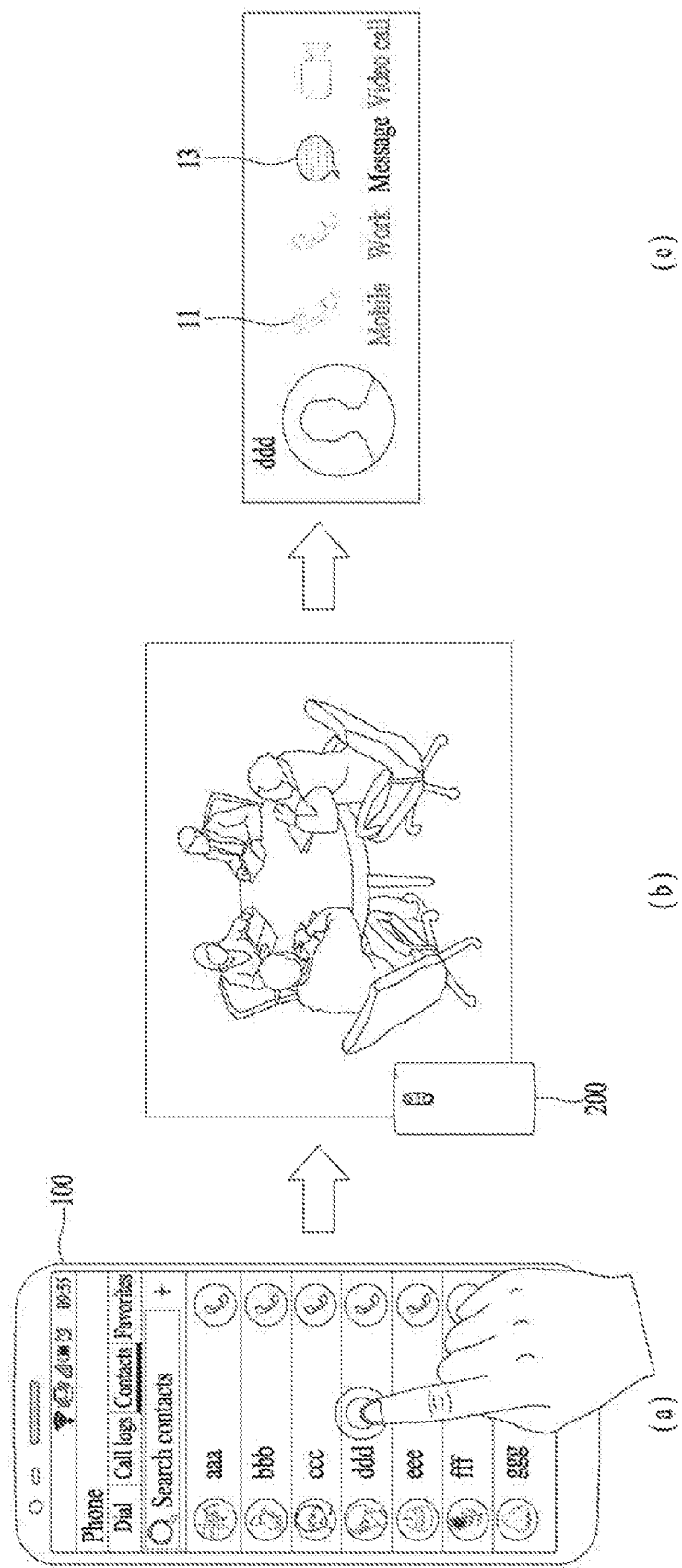

FIG. 5

| Location | User's action | Noise | Schedule |
|---|---|---|---|
| Work | Stop | Normal | Meeting |
| → Since the user is in a meeting, a text message to a mobile phone or a messenger is recommended rather than a voice/video call ||||
| Outdoor | Walking | Loud | None |
| → Since the user is moving, a voice call to a mobile phone or a text message is recommended ||||
| Home | Stop | Loud | None |
| → Since the user is watching a TV, a voice/video call to a mobile phone or a voice call to a home phone is recommended ||||

INTELLIGENT AGENT SYSTEM INCLUDING TERMINAL DEVICE AND CONTROL METHOD THEREFOR

CROSS-REFERENCE TO RELATED APPLICATIONS

This application is the National Stage filing under 35 U.S.C. 371 of International Application No. PCT/KR2015/009486, filed on Sep. 9, 2015, which claims the benefit of earlier filing date and right of priority to Korean Application No. 10-2015-0111442, filed on Aug. 7, 2015, the contents of which are all hereby incorporated by reference herein in their entirety.

TECHNICAL FIELD

The present invention relates to an intelligent agent system including a terminal device and control method therefor.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Some mobile terminals include additional functionality which supports game playing, while other terminals are configured as multimedia players. More recently, mobile terminals have been configured to receive broadcast and multicast signals which permit viewing of content such as videos and television programs.

To support and increase the mobile terminal functions, it may be able to consider the improvement of structural parts and/or software parts of the mobile terminal.

Meanwhile, a user places a call to a recipient using a terminal device. However, the recipient may be hard to answer the call. That is, when getting a call, the recipient may not answer the call or may transmit a message for rejecting the call. Thereafter, the user may make a call again to the recipient or send a text message to the recipient. That is, since the user cannot know the state of the recipient, the user has the inconvenience of attempting to connect to the recipient several times. In some cases, the other party may have a more convenient communication means than the terminal device. For example, when the user places a call to a mobile terminal device of the recipient, if the recipient is in an office, the recipient may prefer to answer the call through an office phone. Therefore, a technology capable of providing an optimal method for connecting with the other party needs to be developed.

DISCLOSURE OF THE INVENTION

Technical Task

Accordingly, an object of the present invention is to address the above-noted and other problems. Another object of the present invention is to provide an intelligent agent system including a terminal device and control method therefor. In this case, the terminal device may be configured to request a selected user to transmit state information, receive the state information, and recommend an optimal connection method based on the received state information or make connection with the selected user according to the optimal connection method.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

To achieve these objects and other advantages, in an aspect of the present invention, provided herein is a terminal device, including: a display unit configured to display a contact list, a communication unit configured to request and receive state information of a user selected from the contact list and a control unit configured to control the communication unit to request and receive the state information in response to the selection of the user, wherein the control unit is configured to extract at least one of a plurality of methods available for connecting to the selected user based on the received state information, to control the display unit to display the extracted at least one connection method, to select one of the extracted connection method based on a predetermined criteria, and to control the communication unit to connect the selected user using the selected connection method.

In addition, the state information may include information on at least one of a location, a movement, a surrounding noise, or a schedule of the selected user.

Moreover, the selected connection method may include at least one of voice call connection to a home phone, voice call connection to a work phone, voice call connection to a personal terminal device, video call connection to the personal terminal device, or message transmission to the personal terminal device.

Meanwhile, the control unit may be configured to control the display unit to display the extracted at least one connection method only.

Alternatively, the control unit may be configured to activate the extracted at least one connection method among the plurality of methods, to control the display unit to display the activated at least one connection method, to deactivate the rest of the plurality of methods except the activated at least one connection method and to control the display unit to display the rest of the plurality of methods.

Additionally, when connecting to the selected user using the selected connection method, the control unit may be configured to control the display unit to display a menu for switching to another extracted at least one connection method.

Additionally, when a group included in the contact list is selected, the control unit may be configured to receive state information of each user included in the selected group, to extract at least one connection method based on the received state information of each user included in the selected group, and control the display unit to display the extracted at least one connection method.

In another aspect of the present invention, provided herein is an intelligent agent system, including: a first terminal device configured to, when a user is selected from a contact list, transmit a request for state information of the selected user and a second terminal device configured to extract the state information according to the request from the first terminal device and transmit the extracted state information to the first terminal device, wherein the first terminal device is configured to receive the state information from the second device, to extract at least one of a plurality of methods available for connecting to the selected user based on the received state information, to display the extracted at least one connection method, to select one of the extracted connection method based on a predetermined criteria and to connect the selected user using the selected connection method.

In a further aspect of the present invention, provided herein is a control method for a terminal device, including: displaying a contact list, when a user is selected from the contact list, requesting state information of the selected user, receiving the requested state information, extracting at least one of a plurality of methods available for connecting to the selected user based on the received state information, displaying the extracted at least one connection method, selecting one of the extracted connection method based on a predetermined criteria and connecting the selected user using the selected connection method.

Advantageous Effects

Effects of a mobile terminal and controlling method thereof according to the present invention are described as follows.

According to at least one embodiment of the present invention, it is possible to determine the state of the other party before connecting to the other party.

In addition, according to at least one embodiment of the present invention, a user can select an optimal connection method in making connection with the other party.

Moreover, according to at least one embodiment of the present invention, when a person is selected, a terminal device makes connection with the selected person using the optimal connection method based on received state information.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

FIG. 4 is a diagram illustrating an embodiment for displaying available connection methods.

FIG. 5 is a diagram illustrating state information according to an embodiment of the present invention.

FIG. 10 is a diagram illustrating an embodiment in which when a shortcut button is selected, connection with the other party is made using an optimal method.

BEST MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
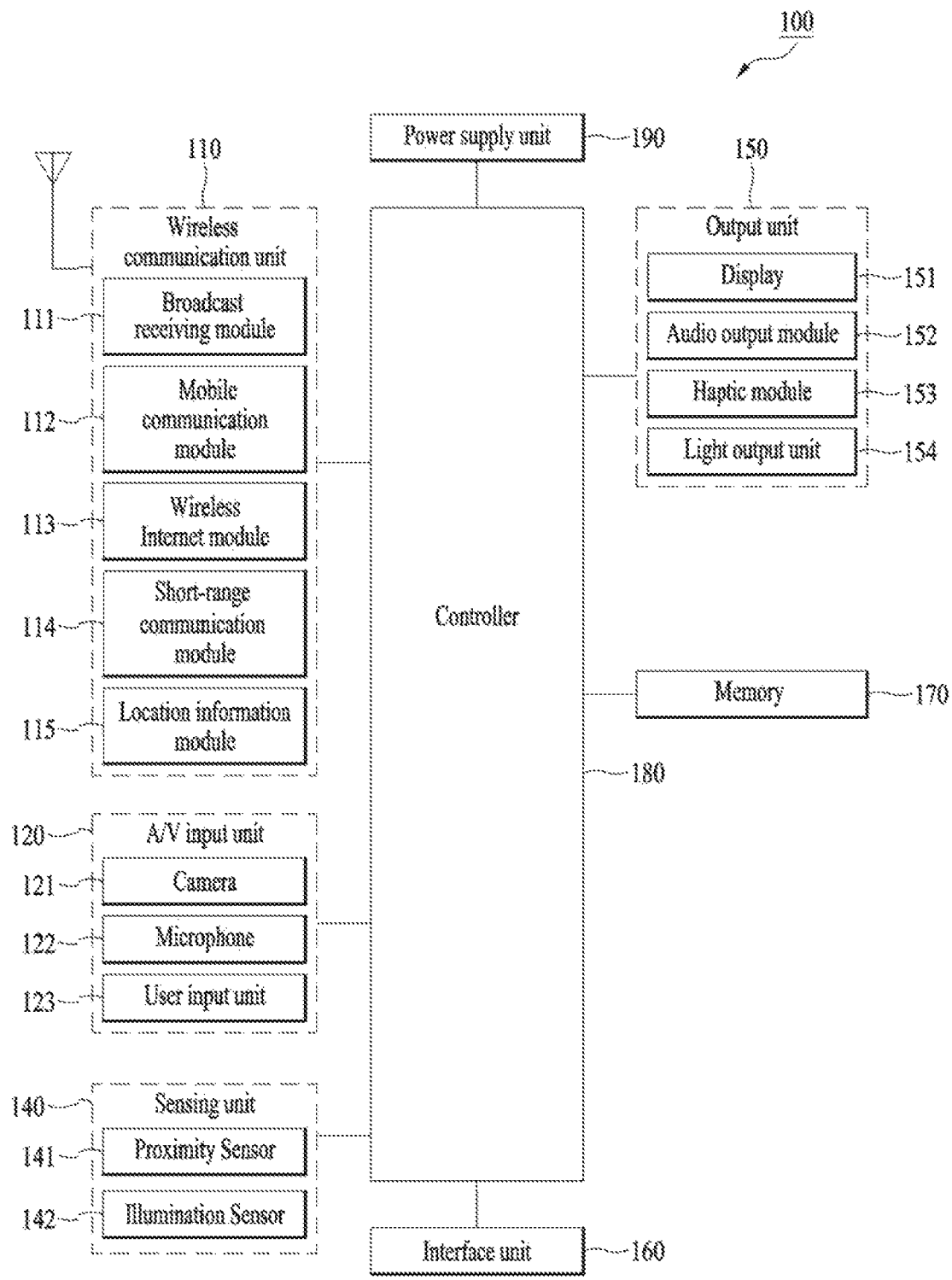
FIG. 1A is a block diagram to describe a mobile terminal related to the present invention.
Figure 1B:
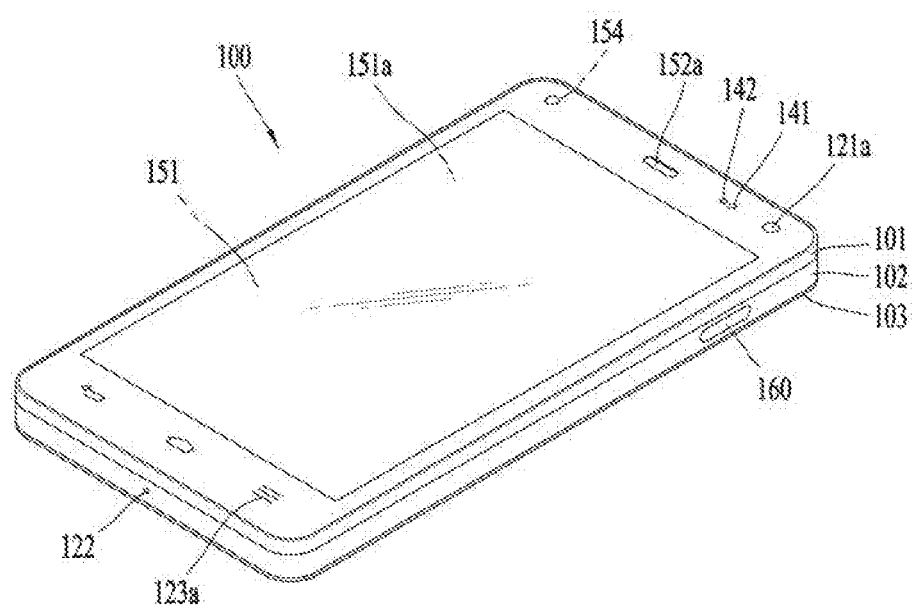
FIG. 1B and FIG. 10 are conceptual diagrams for one example of a mobile terminal related to the present invention in different views.
Figure 1C:
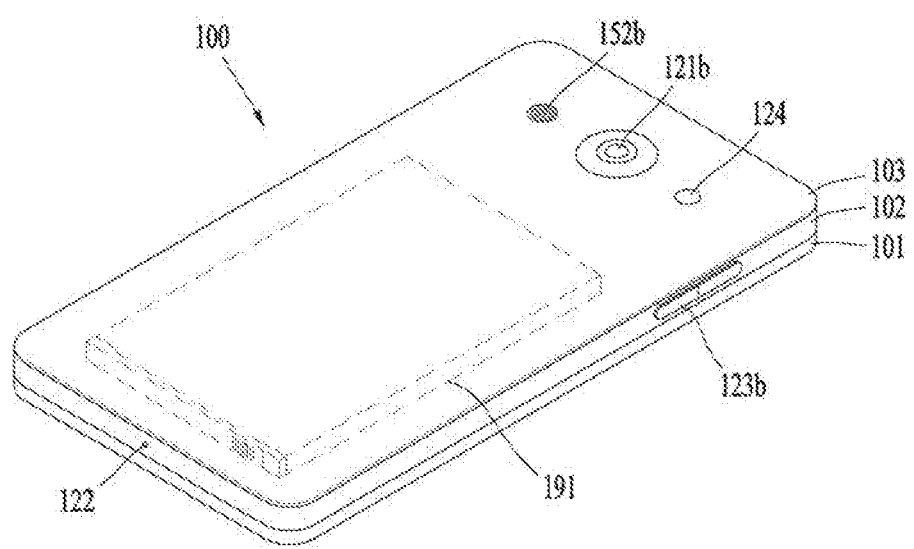

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

For instance, the wireless communication unit 110 typically includes one or more components which permit wireless communication between the mobile terminal 100 and a wireless communication system or network within which the mobile terminal is located.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, and the like) for allowing a user to input information. Data (for example, audio, image, and the like) is obtained by the input unit 120 and may be analyzed and processed by controller 180 according to user commands thereof.

The sensing unit 140 is typically implemented using one or more sensors configured to sense internal information of the mobile terminal, the surrounding environment of the mobile terminal, user information, and the like. For example, in FIG. 1A, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

Moreover, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components can cooperatively operate to implement operations, controls and controlling methods of the mobile terminal according to various embodiments described in the following. The operations, controls or controlling methods of the mobile terminal can be implemented on the mobile terminal by running at least one application program saved to the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), W-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (W-Fi) and Wi-Fi Direct, and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the W-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 10:
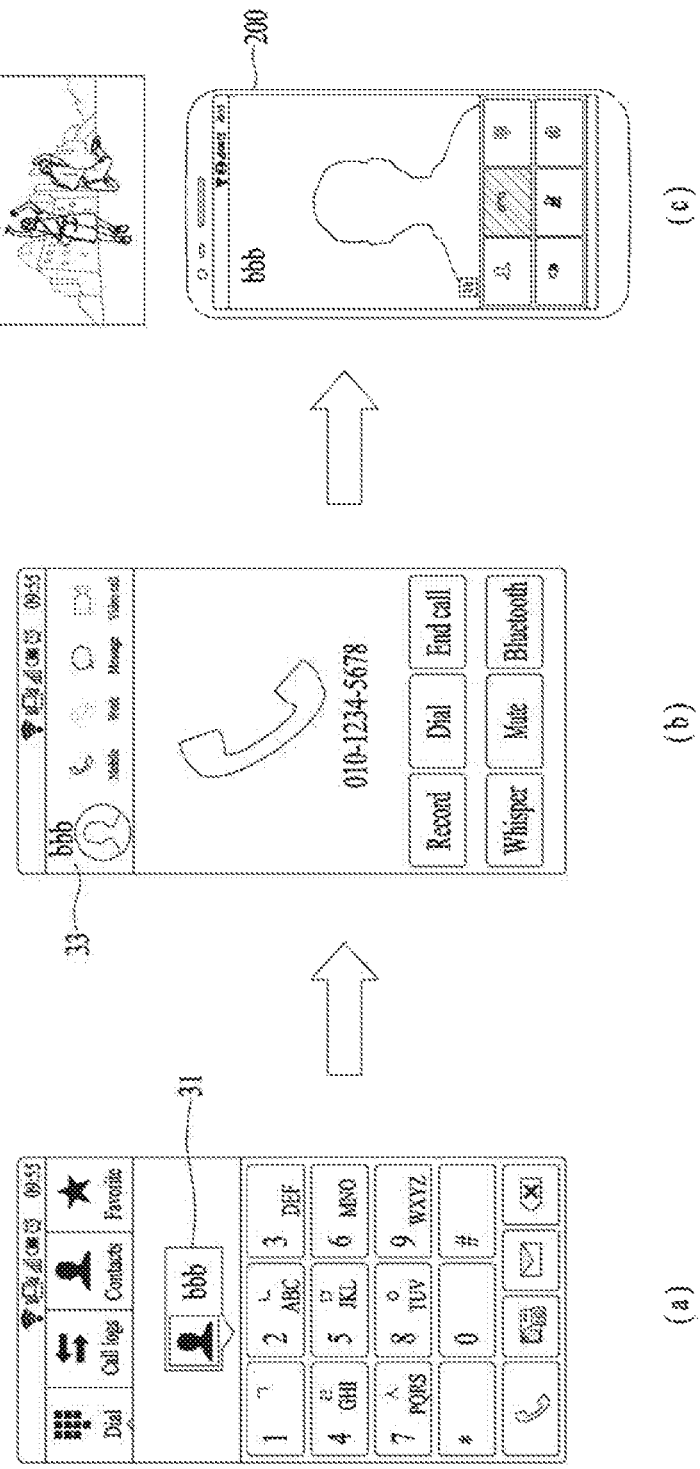

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof.

In this case, the terminal body can be construed as the concept of indicating the mobile terminal 100 as at least one assembly.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 10. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display an execution screen information of an application operated in the mobile terminal or User Interface, Graphic User Interface corresponding to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

Moreover, the display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like.

In the present drawing, the first manipulation unit 123a is a touch key for example, by which the present invention is non-limited. For instance, the first manipulation unit 123 may include a push key (i.e., a mechanical key) or a combination of the touch key and the push key.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

The battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
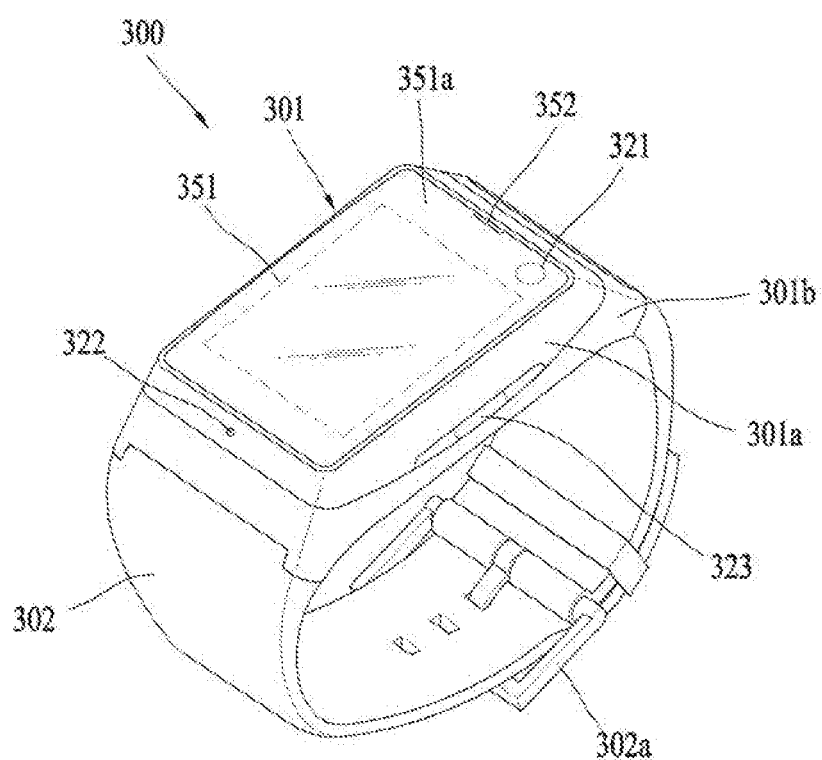
FIG. 2 is a perspective diagram for an example of a mobile terminal of watch-type according to a different embodiment of the present invention.

FIG. 2 is a perspective view illustrating one example of a watch-type mobile terminal 300 in accordance with another exemplary embodiment.

As illustrated in FIG. 2, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Hereinafter, various embodiments related to a control method for the above-described mobile terminal device will be described with accompanying drawings. It will be apparent to those skilled in the art that the present invention may be embodied in other specific forms without departing from the spirit and essential characteristics of the invention.

Figure 3:
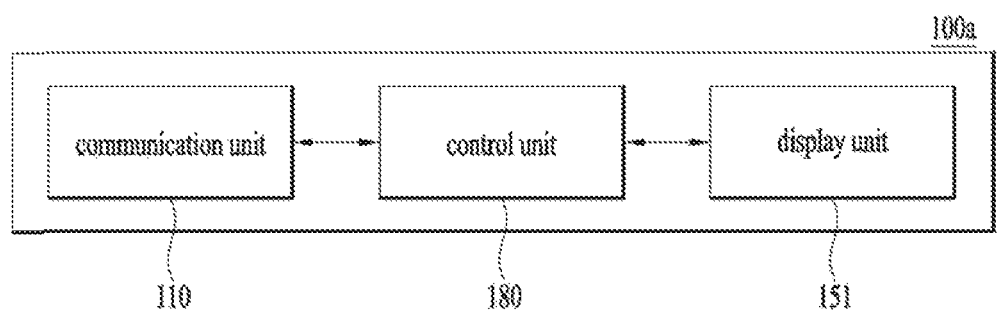
FIG. 3 is a block diagram of a terminal device according to an embodiment of the present invention.

FIG. 3 is a block diagram of a terminal device according to an embodiment of the present invention.

Referring to FIG. 3, a terminal device 100a may include a communication unit 110, a control unit 180, and a display unit 151.

The display unit 151 can display a contact list, a recipient shortcut icon, and the like. A user may select a person from the contact list. For example, the user may select a person who the user desires to make connection with from the stored list by selecting a contact menu. In addition, the user may select a person who the user desires to make connection with by selecting a previously stored shortcut number. Here, the shortcut number may be a shortcut key for making connection with a person in the contact list in a simple manner. Thus, the selection of the shortcut number could be interpreted to mean that the person mapped to the shortcut number is selected from the contact list. Moreover, the user may select a person who the user desires to make connection with by selecting a shortcut icon. The shortcut icon may be an icon associated with a person in the contact list, which is displayed on the main screen. Further, the user may select a person who the user desires to make connection with in a text message. If a person's name in a text message is equal to that stored in the contact list, the terminal device may establish a link therebetween. That is, when the user selects a person in the text message, the same person can be selected from the contact list.

The communication unit 110 can perform communication with a recipient's terminal device or server. For example, when a recipient is selected from the contact list, the communication unit 110 may send a request for state information to a terminal device of the selected recipient and then receive the state information. In an embodiment, the state information may include information on at least one of a location, movement, surrounding noise, and schedule of the selected recipient. Details of the state information will be described later. When receiving the request for the state information from the user's terminal device, the recipient's terminal device can transmit the state information of the recipient.

Alternatively, when a recipient is selected from the contact list, the communication unit 110 may send a request for state information of the recipient to a server and then receive the state information. In an embodiment, the server may generate a profile for each terminal device user and then store each user's state information. In addition, when user state information is changed, each terminal device can transmit the changed user state information. By doing so, the server can always store the latest state information. That is, when the user selects a recipient, the terminal device may request the server to transmit state information of the selected recipient. Thereafter, the server may transmit the selected recipient's state information, and the terminal device may receive the state information.

When a recipient is selected, the control unit 180 can control the communication unit 110 to send a request for state information of the selected recipient. In an embodiment, the control unit 180 may include an intelligent agent module. In this case, the intelligent agent module may be implemented in hardware or software.

An intelligent agent (IA) may mean a program or system capable of collecting information periodically and providing some services in a dynamic environment without user intervention. The IA uses a sensor to cooperates with an external environment. The external environment may include an operating system, a network, etc. In addition, the IA may have a knowledge base and reasoning function, and also exchange information or communicate with a user, a resource, or another agent to solve problems.

The IA can make its own decision and operate without direct or indirect intervention from other objects, control its operation or state, and cooperate with a human or another agent using communication language. In addition, the IA can not only handle with changes by recognizing an environment such as the system or the Internet but also operate independently. Moreover, the IA can perform operation continuously rather than discretely for similar input.

In general, when a recipient is selected, a terminal device attempts to make connection with the selected recipient. However, according to the present invention, when a recipient is selected, the control unit 180 may send a request for state information of the selected recipient and then receive the requested state information. In addition, the control unit 180 may extract at least one connection method from various connection methods based on the received state information. Thereafter, the control unit 180 may control the display unit 151 to display the extracted at least one connection method. Alternatively, the control unit 180 may select one connection method from the extracted at least one connection method according to a predetermined standard and then control the communication unit 110 to make connection with the recipient using the selected method.

That is, when a recipient is selected from the contact list, the user's terminal device may send a request for state information of the recipient to a terminal device of the recipient. Alternatively, when the recipient is selected from the contact list, the user's terminal device may send the request for the state information of the recipient to the server. The user's terminal device may receive the state information of the recipient from either the recipient's terminal or server. The user's terminal device may extract methods available for making connection with the recipient based on the received state information. Thereafter, to make the connection with the recipient, the user's terminal device may display the extracted available connection methods or select one of them according to a predetermined standard.

Hereinafter, methods available for making connection with a recipient using state information will be described with reference to various embodiments.

FIG. 4 is a diagram illustrating an embodiment for displaying available connection methods.

In FIG. 4(a), the terminal device 100 is illustrated. The user may select a contact list menu of the terminal device 100, and the terminal device 100 may display a stored contact list. The user may select a single person. In FIG. 4, the user selects a person named 'ddd', and the selected person is a recipient who the user desires to make connection. When the recipient (e.g., ddd) is selected, the terminal device 100 may send a request for state information of the recipient. As described above, the terminal device 100 may send a request for the state information to a server (not shown in the drawing) or a terminal device 200 of the recipient.

In FIG. 4(b), the terminal device 200 of the recipient is illustrated. For example, the state information may include information on at least one of a location, movement, surrounding noise, and schedule of the selected recipient. The recipient may attend a meeting with the terminal device 200. In this case, the terminal device 200 may detect that the recipient is in a meeting room and there is almost no movement and surrounding noise. If the recipient stores a meeting schedule in the terminal device 200, the recipient's terminal device 200 may detect information on the meeting schedule. In this case, the recipient's terminal device 200 may transmit the detected state information to the user's terminal device 100.

FIG. 4(c) illustrates the terminal device 100 displays connection methods. The user may communicate with the recipient using the terminal device 100 in various ways. For example, the user's terminal device 100 may store a mobile phone number, work phone number, or home phone number of the recipient. In addition, the user's terminal device 100 may send a voice call, video call, or text message to the mobile phone number of the recipient.

The user's terminal device 100 may receive the state information from the recipient's terminal device 200. Using the received state information, the user's terminal device 100 may extract methods available for making connection to the recipient. Specifically, the user's terminal device 100 may determine that the recipient is in a meeting based on the received state information. Subsequently, the user's terminal device 100 may determine that message transmission is possible only because the recipient is attending the meeting.

The user's terminal device 100 may display all methods available for connecting to the recipient. As shown in FIG. 4(c), the user's terminal device 100 may display menus of a mobile phone, work phone, message, and video call. In particular, the user's terminal device 100 may display currently available connection methods. Since the message transmission is possible only, the user's terminal device 100 may activate a message transmission menu 13 and display the activated message transmission menu 13. On the other hand, since the mobile phone connection is not available, the user's terminal device 100 may deactivate a mobile phone connection menu 11 and display the deactivated mobile phone connection menu 11. In other words, the user's terminal device 100 may display all methods available for connecting to the selected recipient. Further, the user' terminal device 100 may activate available connection methods and then display the activated methods. However, the user' terminal device 100 may deactivate unavailable connection methods and then display the deactivated methods.

The user can transmit a message to a recipient by selecting a message transmission function.

FIG. 5 is a diagram illustrating state information according to an embodiment of the present invention.

Referring to FIG. 5, the state information may include a location, action (or movement), surrounding noise, and schedule of a recipient. The location of the recipient may be determined using a GPS, a short-range communication signal, etc. The action of the recipient may be determined using a geomagnetic sensor, an acceleration sensor, a gravity sensor, etc. The surrounding noise may be determined using a microphone.

As described above, the terminal device may extract available connection methods based on the received state information. For example, when the recipient is at work, it is generally considered that the recipient's location is work, the recipient's action is almost zero, and the recipient's noise level is normal. In some cases, the recipient's location may be determined specifically as, for example, an office room, a meeting room, etc. If it is determined that the recipient is at work (or in the office room), the recipient's action is almost zero, and the recipient's noise level is normal, the terminal device may determine that the recipient is in the office room. Thus, the terminal device may recommend a work phone connection, a voice call to a mobile phone, message transmission, etc. If it is determined that the recipient is at work (or in the meeting room), the recipient's action is almost zero, the recipient's noise level is normal, the recipient's schedule is a meeting, the terminal device may determine that the recipient is attending to the meeting. Thus, the terminal device may recommend the message transmission.

In addition, when it is determined that the recipient is outdoor, the recipient is walking, and the recipient's noise level is loud, the terminal device may determine that the recipient is moving. Thus, the terminal device may recommend the voice call to the mobile phone, the message transmission, or the like. When it is determined that the recipient is at home, the recipient's action is almost zero, and the recipient's noise level is loud, the terminal device may determine that the recipient is together with other people or watching TV. Thus, the terminal device may recommend the voice call to the mobile phone, a video call to the mobile phone, or a home phone connection. Additionally, the state information is not limited to the items illustrated in FIG. 5 and can further include various items.

Meanwhile, the user's terminal device may display extracted connection methods in various ways.

Figure 6:
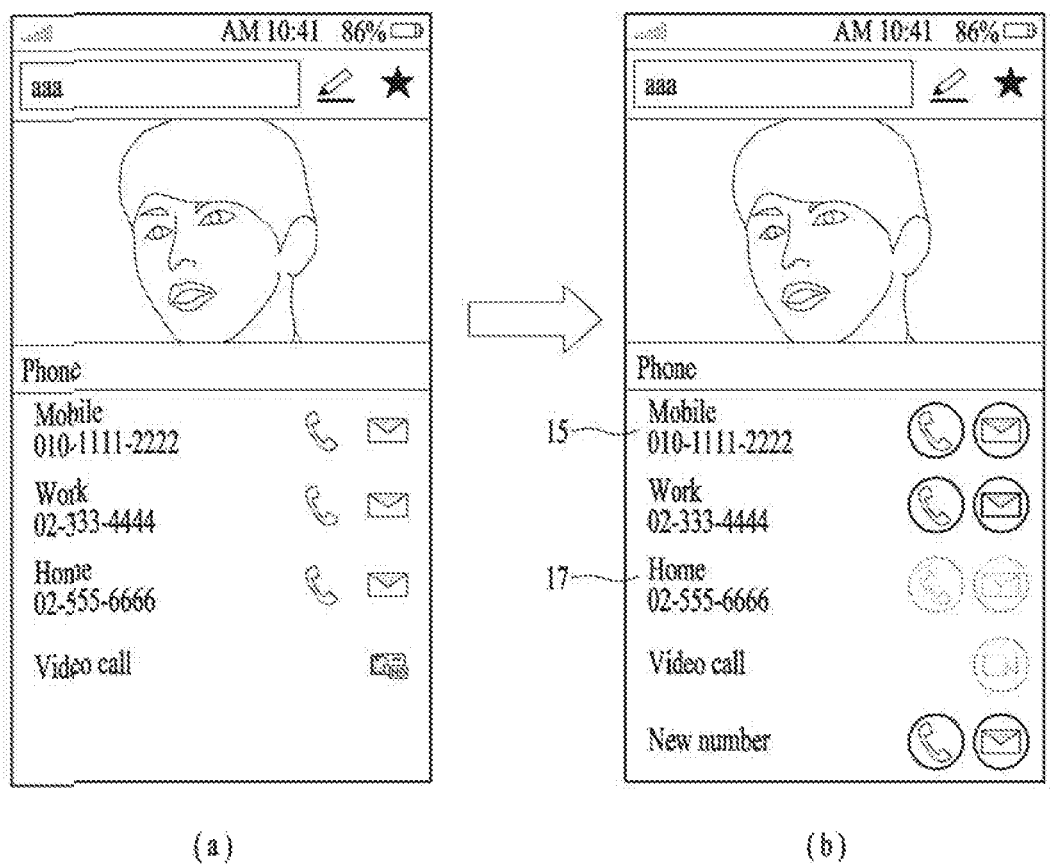
FIG. 6 is a diagram illustrating another embodiment for displaying available connection methods.

FIG. 6 is a diagram illustrating another embodiment for displaying available connection methods.

FIG. 6(a) illustrates that the terminal device illustrates a selected recipient. For example, the recipient selected by the user may be 'aaa', and the terminal device may have a mobile phone number, work phone number, and home phone number of 'aaa'. When the recipient (e.g., aaa) is selected, the terminal device may request state information and then receive the requested state information. In an embodiment, the terminal device may send a request for the state information of the recipient to the server. When receiving the state information of the recipient, the terminal device may extract methods available for making connection with the recipient using the received state information.

FIG. 6(b) illustrates that the terminal device displays the methods available for connecting to the recipient. For example, based on the state information, the terminal device may determine that the recipient is in an office room. Thus, the terminal device may recommend connection methods such as voice call and message transmission to a mobile phone 15, voice call and message transmission to a work phone, and the like. In this case, the terminal device may activate and display the voice call and message transmission to the mobile phone 15 and the voice call and message transmission to the work phone. On the other hand, the terminal device may deactivate and display voice call and message transmission to a home phone 17, which is impossible.

Meanwhile, the recipient may have a new terminal device capable of performing a communication function. The server may include not only the state information of the recipient but also all numbers for connecting to the recipient. Thus, when transmitting the state information of the recipient to the user's terminal device, the server may transmit a number of the new terminal device together. The user's terminal device may receive the phone number of the new terminal device. When it is determined that connection to the new terminal device can be established, the user's terminal device may additionally display a method of connecting to the new terminal device. In addition, when getting a call from an unknown person, the user's terminal can identify the unknown person using a plurality of pieces of additional information.

Figure 7:
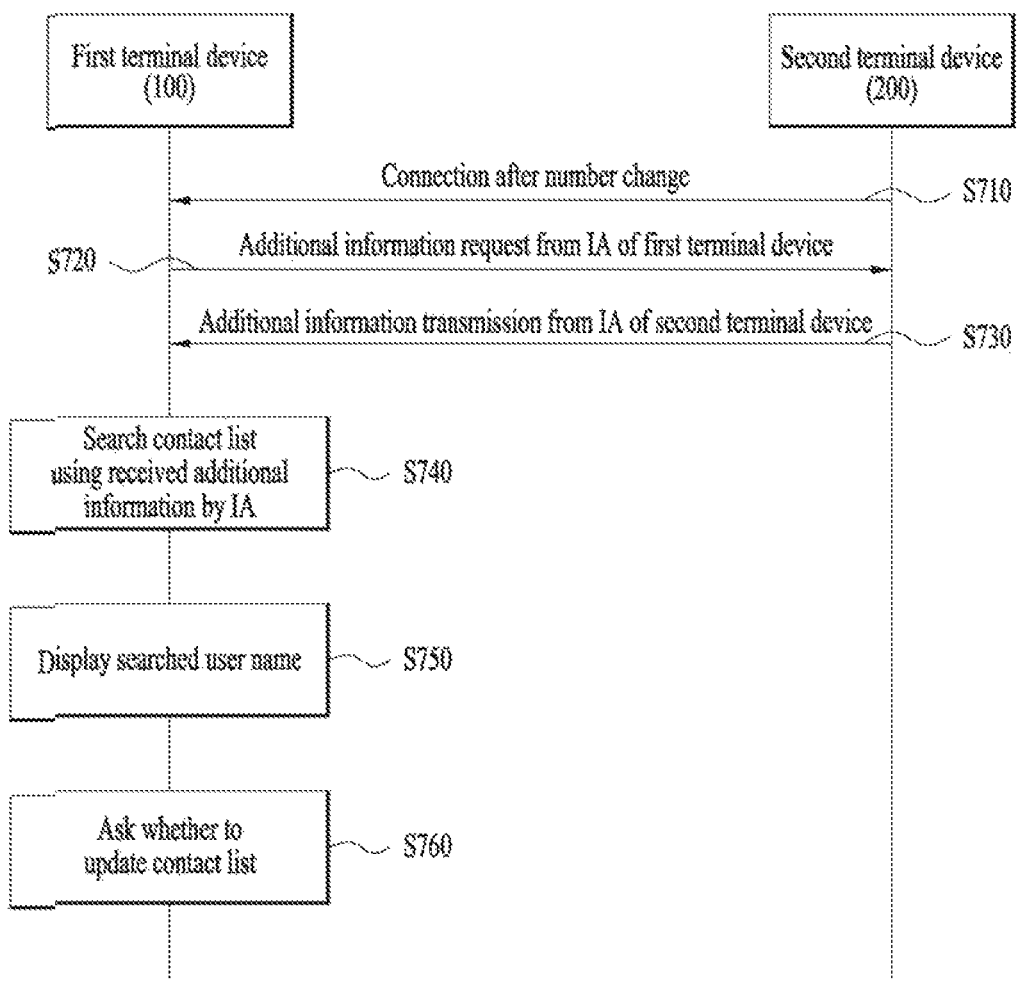
FIG. 7 is a diagram illustrating an embodiment for identifying an unknown person.

FIG. 7 is a diagram illustrating an embodiment for identifying an unknown person.

Specifically, FIG. 7 is a timing diagram for explaining operation between a first terminal device 100 and a second terminal device 200. As described above, the first terminal device 100 may request state information of the second terminal device 200 in order to connect to the second terminal device 200 according to an optimal connection method. Subsequently, the first terminal device 100 may select the optimal connection method based on the state information received from the second terminal device 200. Thereafter, the first terminal device 100 may display the optimal connection method or connect to the second terminal device 200 according to the optimal connection method.

Meanwhile, the first terminal device 100 may receive a connection request from the second terminal device 200. In an embodiment, the first terminal device 100 may receive a call from the second terminal device 200. If a number of the second terminal device 200 matches that stored in a contact list, the first device may display the name of the matched sender. A user of the second terminal device 200 can make connection with the first terminal device 200 after changing the number or by using a new number [S710]. In this case, since the first terminal device 100 does not have information on the second terminal device 200, the first terminal device 100 may display the user of the second terminal device 200 as an unknown sender.

The first terminal device 100 can send a request for additional information to the second terminal device 200 [S720]. Specifically, when the user of the second terminal device 200 is unknown, an IA of the first terminal device 100 may request the second terminal device 200 to transmit the additional information. Here, the additional information may mean information required to recognize the user of the second terminal device 200. For example, the additional information may include a different phone number (e.g., a home phone number, a work phone number, a phone number of another terminal device, etc.), a name, an email account, an SNS account, a cloud server account, and the like.

After receiving the request from the first terminal device 100, the second terminal device 200 can transmit the additional information to the first terminal device 100 [S730]. Specifically, an IA of the second terminal device 200 may transmit the additional information to the first terminal device 100. The first terminal device 100 can search the contact list using the received additional information [S740]. If the first terminal device 100 detects the matched user, the first terminal device 100 can display the name of the detected user [S750]. For example, the first terminal device 100 may change the unknown sender to the detected user. When the call is completed, the first terminal device can ask the user whether to add the new phone number to phone numbers of the detected user or change the existing phone number of the detected user to the new phone number [S760].

Although FIG. 7 shows the embodiment in which the first terminal device 100 requests the additional information to the second terminal device 200, the first terminal device 100 may request the additional information to the server (not shown in the drawing). In an embodiment, when transmitting information on the received phone number to the server, the first terminal device 100 may send a request for relevant additional information together. The server searches for the additional information related to the phone number received from the first terminal device 100 and then transmit the additional information. After receiving the additional information, the first terminal device 100 may search the contact list using the received additional information.

Figure 8:
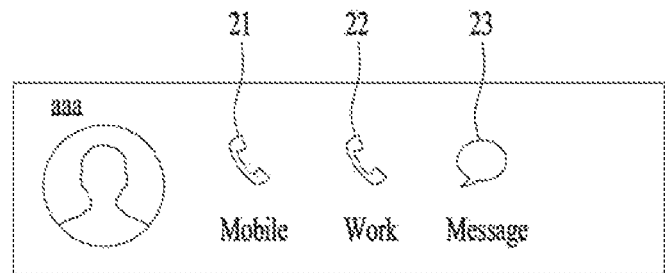
FIG. 8 is a diagram illustrating a further embodiment for displaying available connection methods.

FIG. 8 is a diagram illustrating a further embodiment for displaying available connection methods.

FIG. 8 illustrates that methods available for connecting to a recipient are displayed on a screen. For example, a recipient selected by the user may be 'aaa', and the terminal device may store a mobile phone number, work phone number, and home phone number of 'aaa'. When the recipient (e.g., aaa) is selected, the terminal device may request state information and then receive the requested state information. After receiving the recipient's state information, the terminal device may extract methods available for connecting to the recipient using the received state information. Based on the state information, the terminal device may determine that the recipient is in an office room. Thus, the terminal device may recommend connection methods including a voice call to a mobile phone, a voice call to a work phone, and a message to the mobile phone. The connection methods such as the voice call to the mobile phone, the voice call to the work phone, and the message to the mobile phone, which are displayed on the terminal device, are different from those shown in FIG. 6. That is, the terminal device may display only the connection methods extracted based on the state information.

Meanwhile, the terminal device may extract and display connection methods for a plurality of persons included in a group.

Figure 9:
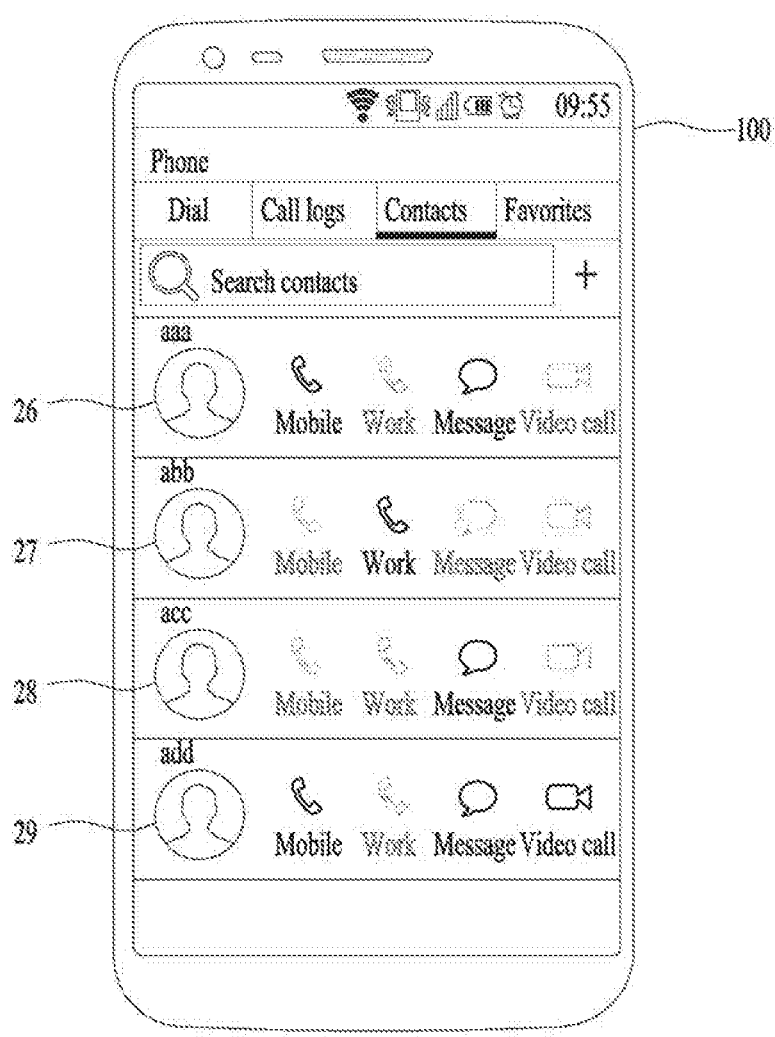
FIG. 9 is a diagram illustrating an embodiment for displaying methods available for connecting to each of a plurality of users in a group.

FIG. 9 is a diagram illustrating an embodiment for displaying methods available for connecting to each of a plurality of users in a group.

The user's terminal device 100 may request state information of a selected recipient. If the user selects a group, the terminal device 100 may request state information of all group members 26, 27, 28, and 29 in the selected group. As described above, the terminal device 100 may send a request for the state information of all the group members 26, 27, 28, and 29 to the server. When receiving the request from the terminal device 100, the server may transmit stored state information of the group members 26, 27, 28, and 29 to the terminal device 100. Alternatively, the user's terminal device 100 may send a request for state information to a terminal device of each of the group members 26, 27, 28, and 29 and then receive the state information from the terminal device of each of the group members 26, 27, 28, and 29.

For example, based on the received state information of the first user 26, aaa, the user's terminal device 100 may determine that the first user 26 is moving. Thus, the terminal device 100 may activate and display a voice call option regarding a mobile phone and a message transmission option. Based on the received state information of the second user 27, abb, the terminal device 100 may determine that the second user 27 is in an office room at work. Thus, the terminal device 100 may activate and display a voice call option regarding a work phone. Based on the received state information of the third user 28, acc, the terminal device 100 may determine that the second user 28 is in a meeting. Thus, the terminal device 100 may activate and display the message transmission option. Based on the received state information of the fourth user 29, add, the terminal device 100 may determine that the second user 29 is at home. Thus, the terminal device 100 may activate and display the voice call option regarding the mobile phone, the message transmission option, and a video call option. The terminal device 100 may recommend available connection methods for all the members 26, 27, 28, and 29 in the selected group. In addition, the terminal device 100 may activate and display available connection methods and deactivate and display unavailable connection methods. Alternatively, the terminal device 100 may display only the available connection methods for all the members 26, 27, 28, and 29 in the selected group.

Meanwhile, the terminal device 100 may making connection with a selected recipient using a single connection method instead of displaying available connection methods.

FIG. 10 is a diagram illustrating an embodiment in which when a shortcut button is selected, connection with the other party is made using an optimal method.

Referring to FIG. 10(a), the user may register (match) a person in the contact list as (to) a shortcut button and then store the person registered as the shortcut button. By doing so, the user may select the person (recipient) by pressing the shortcut button. For example, the user may register (match) a person 31, bbb as (to) button 2. When the user presses button 2, the person 31, bbb may be selected.

FIG. 10(b) illustrates that the terminal device places a call to a mobile phone of the selected recipient, bbb. When the recipient, bbb is selected, the terminal device may send a request for state information to the selected recipient, bbb and then receive the state information from the selected recipient, bbb. Alternatively, as described above, the terminal device may receive the state information of the selected recipient, bbb from the server.

For example, the selected recipient, bbb may be outdoor. In this case, the terminal device 100 may receive the state information indicating that the recipient is outdoor, the recipient is moving, and a recipient's noise level is loud. The terminal device may extract, as methods available for connecting to the selected recipient, two connection methods such as call connection to the mobile phone and message transmission and then select the call connection to the mobile phone from the two methods. The terminal device may prioritize a plurality of connection methods. Thus, when there are a plurality of connection methods, the terminal device may make the connection with the selected user by selecting one connection method according to the priority.

Meanwhile, the terminal device may display other available methods while connecting to the mobile phone of the selected recipient. The terminal device may place a call or send a message to the selected recipient. As shown in FIG. 10(b), the terminal device may activate the call connection to the mobile phone and message transmission, and then display the activated connection methods in an area 33. That is, when the terminal device makes the connection with the selected recipient by selecting one method, the terminal device may display a menu 33 for switching to the other extracted connection method. In other embodiments, the menu 33 for switching to the other extracted connection method can also be displayed. When the user selects the activated message transmission, the terminal device terminates the call connection to the mobile phone and switch to a screen for transmitting a message.

Referring to FIG. 10(c), it can be seen that that the terminal device is connected to the selected recipient (user), bbb. If the user does not select the other connection method, the terminal device may continuously attempt to place a call to the mobile phone. When the selected recipient, bbb answers the call, the user can talk to the selected recipient.

The terminal device may attempt to make connection with a person selected from the contact list in a similar manner.

Figure 11:
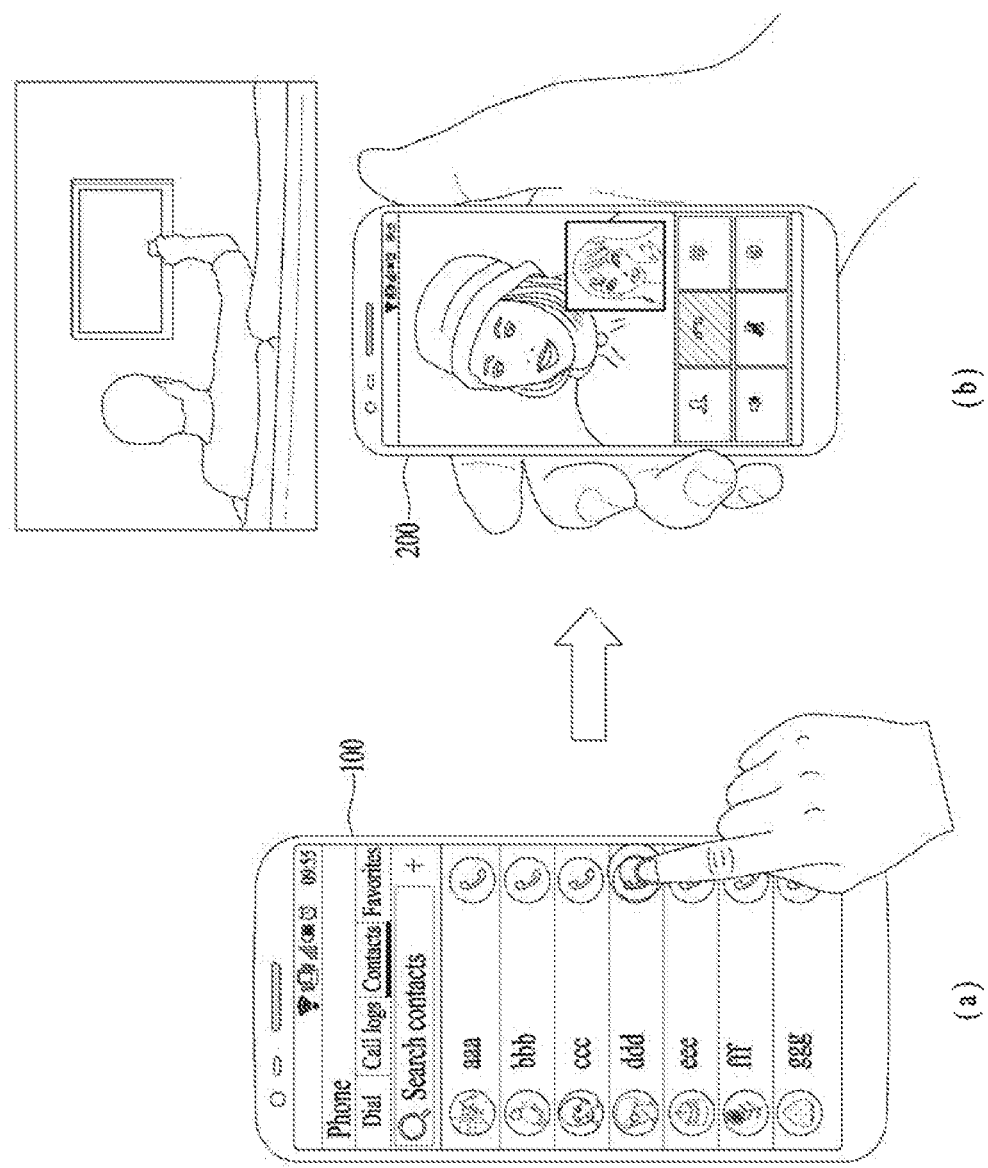
FIG. 11 is a diagram illustrating an embodiment in which when a person is selected from a list, connection with the person is made using an optimal method.

FIG. 11 is a diagram illustrating an embodiment in which when a person is selected from a list, connection with the person is made using an optimal method.

FIG. 11(a) illustrates a contact list screen. The terminal device 100 may display the contact list screen according to user's selection. The terminal device 100 may store a plurality of phone numbers or connection methods for a single person. However, since the terminal device 100 may select an optimal connection method and then make connection with a selected recipient using the optimal connection method, the terminal device 100 may display a person's name and a connection button on the contact list. In addition, the user may select a single person.

FIG. 11(b) illustrates a terminal device 200 of a recipient, ddd, which is connected with the user. The terminal device 100 may request state information of the selected recipient and then receive the requested state information. For example, the selected recipient may watch TV at home. The terminal device 100 may receive the state information indicating that the selected recipient is at home, the selected recipient is not moving, and a recipient's noise level is loud. Subsequently, the terminal device 100 may determine that the selected recipient is watching TV at home and then extract, as methods available for connecting to the selected recipient, connection to a mobile phone, video call connection, and message transmission. Thereafter, the terminal device 100 may select the video call connection. For instance, the terminal device 100 may set the video call connection to have the highest priority. The terminal device 100 may attempt to the terminal device 200 of the recipient for the video call. As described above, the terminal device 100 may display a menu 33 for switching to another extracted connection method. When the selected recipient answers the call, the user can talk to the selected recipient through the video call.

Figure 12:
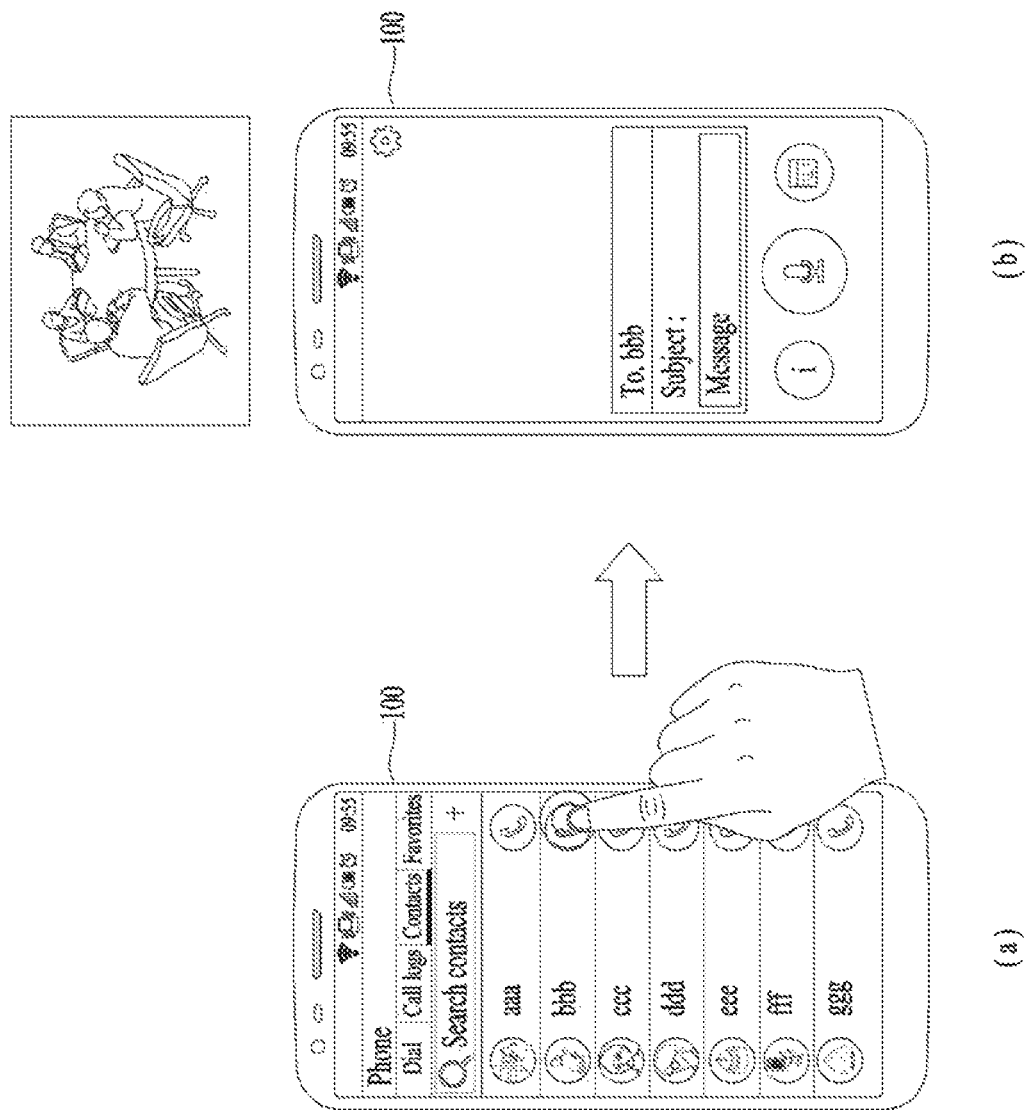
FIG. 12 is a diagram illustrating another embodiment in which when a person is selected from a list, connection with the person is made using an optimal method.

FIG. 12 is a diagram illustrating another embodiment in which when a person is selected from a list, connection with the person is made using an optimal method.

FIG. 12(a) illustrates a contact list screen. The terminal device 100 may display the contact list screen according to user's selection, and the user may select a single person.

FIG. 12(b) illustrates that terminal device 100 displays a text message screen. The terminal device 100 may request state information of a selected recipient, bbb and then receive the requested state information. For example, the recipient may be in a meeting. In this case, the terminal device 100 may receive the state information indicating that the recipient is at work, the recipient is not moving, a recipient's noise level is normal, and a recipient's schedule is a meeting. Subsequently, the terminal device 100 may determine that the recipient is attending the meeting and then extract message transmission as a method available for connecting to the selected recipient. Thus, the terminal device 100 may switch to a message writing screen. After the use write a message, the terminal device 100 may send the message to a terminal device of the recipient.

When a shortcut icon is selected, the terminal device may attempt to make connection with a selected person.

Figure 13:
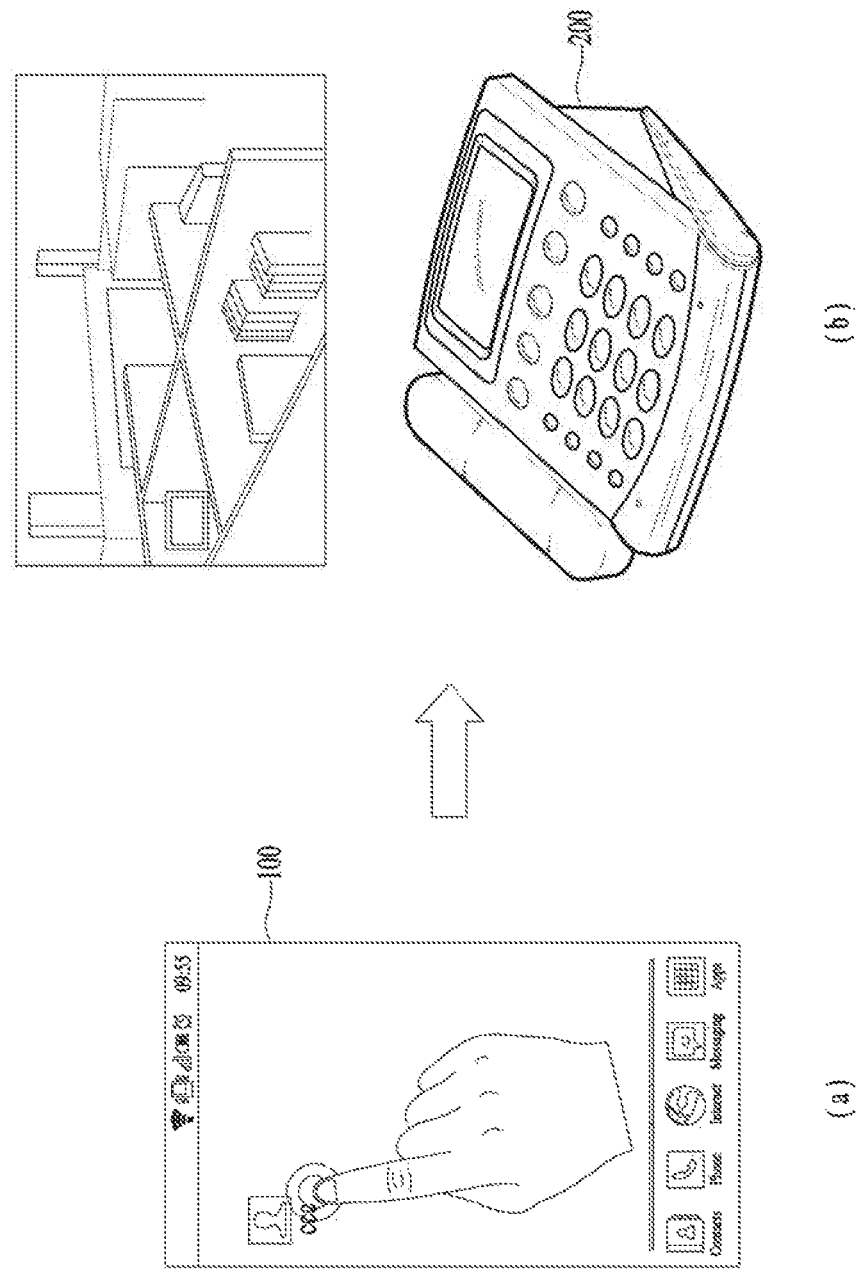
FIG. 13 is a diagram illustrating an embodiment in which when a shortcut icon is selected, connection with the other party is made using an optimal method.

FIG. 13 is a diagram illustrating an embodiment in which when a shortcut icon is selected, connection with the other party is made using an optimal method.

FIG. 13(a) illustrates a selected shortcut icon of the terminal device 100. The terminal device 100 may generate a shortcut icon corresponding to a person in the contact list on the main screen. The generated shortcut icon is linked to a phone number of the person in the contact list. The user may select the person by selecting the shortcut icon.

FIG. 13(b) illustrates that a work phone 200 is connected with the user's terminal device 100. The terminal device 100 may request state information of a selected recipient, ccc and then receive the requested state information. For example, the selected recipient may be in an office room. In this case, the terminal device 100 may receive the state information indicating that the recipient is at work (or in the office room), the recipient is not moving, and the recipient's noise level is normal. Subsequently, the terminal device 100 may determine that the selected recipient is in the office room, and then extract, as methods available for connecting to the selected recipient, a work phone connection, a mobile phone connection, and message transmission. Thereafter, the terminal device 100 may select the work phone connection. The terminal device 100 may set the work phone connection among the extracted connection methods to have the highest priority.

Meanwhile, the terminal device 100 may make connection with a person using information of the person mentioned in a message.

Figure 14:
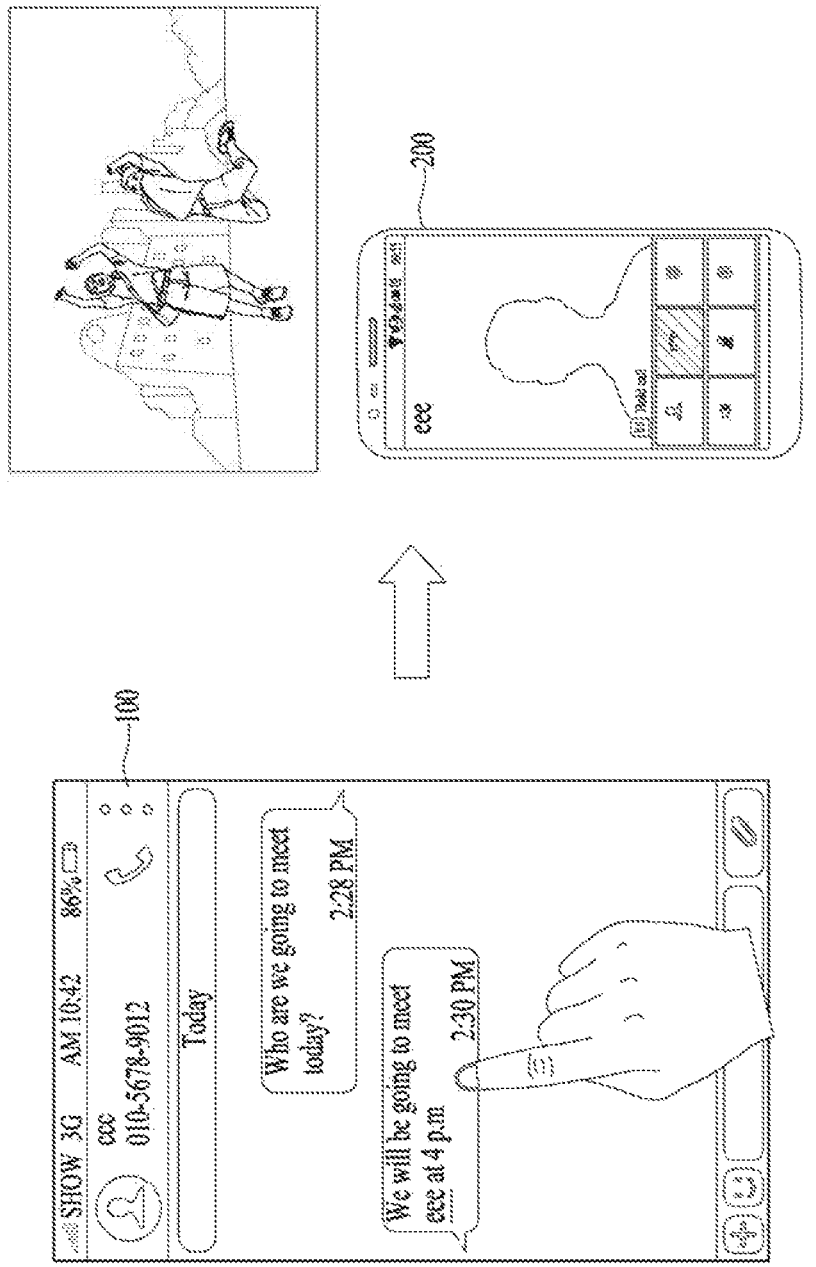
FIG. 14 is a diagram illustrating an embodiment in which when a person is recognized from a message, connection with the person is made using an optimal method.

FIG. 14 is a diagram illustrating an embodiment in which when a person is recognized from a message, connection with the person is made using an optimal method.

FIG. 14(a) illustrates that the terminal device 100 displays a message screen. The user of the terminal device 100 may chat with a first user, ccc through messages. In this case, the messages may include a second user, eee. If a phone number of the second user, eee is included in the contact list, the terminal device 100 may link a second user area to the contact list and then display the established link. The user may select the linked second user area to connect to the second user.

FIG. 14(b) illustrates a terminal device 200 of the second user. The user's terminal device 100 may request state information of the selected user, eee and then receive the requested state information. For example, the selected recipient may be outdoor. In this case, the terminal device 100 may receive the state information indicating that the recipient is outdoor, the recipient is moving, and a recipient's noise level is loud. Subsequently, the terminal device may extract, as methods available for connecting to the selected recipient, a mobile phone connection and message transmission. The terminal device 100 may select the mobile phone connection from the two connection methods. The terminal device 100 may set the mobile phone connection to have a higher priority than the message transmission. The terminal device 200 of the selected recipient may receive a call from the user's terminal device 100.

Hereinabove, various embodiments in which a terminal device recommends available connection methods or make connection with a selected recipient using a single connection method have been described. The terminal device can also transmit data based on state information of a terminal device of the selected recipient.

Figure 15:
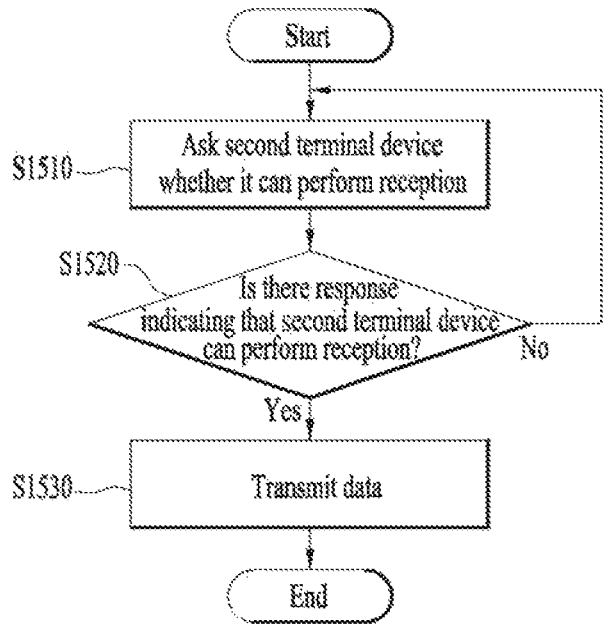
FIG. 15 is a flowchart of a data transmission method according to an embodiment of the present invention.

FIG. 15 is a flowchart of a data transmission method according to an embodiment of the present invention.

Referring to FIG. 15, a transmitting terminal device can attempt to transmit data to a second terminal device. The transmitting terminal device may ask the second terminal device whether the second terminal device can receive the data [S1510]. The transmitting terminal device may transmit information on the data to be transmitted. For example, data information may include information on the amount and type of data. When receiving the data transmission request from the transmitting terminal device, the second terminal device may extract its state information. For instance, the state information, which is determined for the data reception, may include a communication network connection state (e.g., data network connection state, W-Fi connection state, etc.), a battery state, the amount of data that can be received, a memory capacity, information on whether the second terminal is calling, schedule information, position information, and the like.

Based on the extracted state information, the second terminal device can transmit, to the transmitting terminal device, whether it can receive the data. The transmitting terminal device can receive, from the second terminal device, a response on whether the second terminal device can receive the data [S1520].

If the transmitting terminal device receives a response indicating that the second terminal is unable to receive the data, the transmitting terminal device may hold the data transmission. In addition, the transmitting terminal device may transmit, to the second terminal device, a notification indicating that the data transmission is held. After elapse of a predetermined time, the transmitting terminal device may ask the second terminal device again whether it can perform the data reception. If the second terminal transmits the negative response, the transmitting terminal device may hold the data transmission again.

If the transmitting terminal device receives a response indicating that the second terminal can receive the data, the transmitting terminal device can transmit the data [S1530]. That is, the transmitting terminal device may perform or hold the data transmission according to the state information of the receiving terminal device. FIG. 15 shows an embodiment in which a receiving terminal device determines whether it can receive data based on its state information and then informs a transmitting terminal device of its data reception capability.

Figure 16:
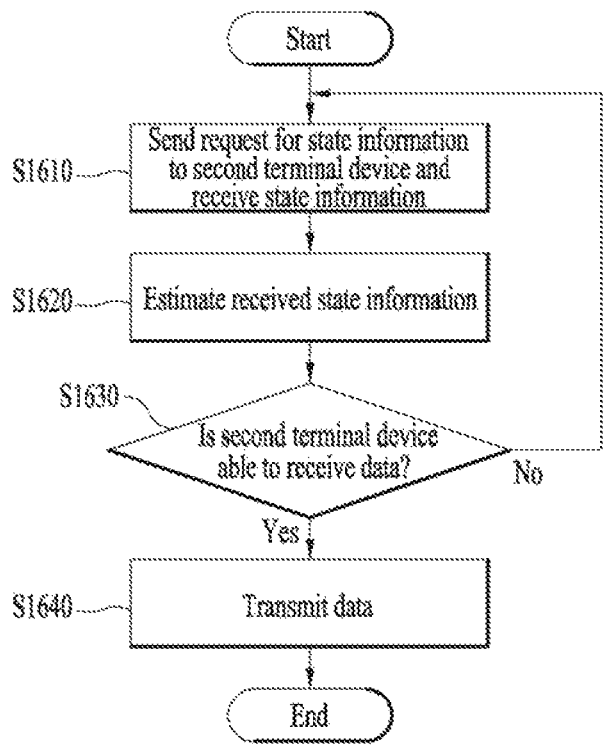
FIG. 16 is a flowchart of a data transmission method according to another embodiment of the present invention.

FIG. 16 is a flowchart of a data transmission method according to another embodiment of the present invention.

Referring to FIG. 16, a transmitting terminal device can send a request for state information to a second terminal device and then receive the requested state information from the second terminal device [S1610]. When receiving a data transmission request, the second terminal device may extract its state information. For instance, the state information, which is determined for data reception, may include a communication network connection state (e.g., data network connection state, W-Fi connection state, etc.), a battery state, the amount of data that can be received, a memory capacity, information on whether the second terminal is calling, schedule information, position information, and the like. The second terminal device may transmit the extracted state information to the transmitting terminal device.

Using the received state information, the transmitting terminal device can determine whether the second terminal device can receive data [S1620]. For example, the transmitting terminal device may receive the state information indicating that Wi-Fi is turned on, the remaining battery is more than 50%, and there is no schedule. In this case, the transmitting terminal device may determine that it can transmit data to the second terminal device. On the other hand, the transmitting terminal device may receive the state information indicating that Wi-Fi is turned off and there is a schedule. In this case, the transmitting terminal device may determine that it cannot transmit data to the second terminal device.

The transmitting terminal device can hold or perform data transmission according to whether it can transmit data [S1630]. If it is determined that the transmitting terminal device cannot transmit data, the transmitting terminal device may transmit, to the second terminal device, a notification indicating that the data transmission is held. After elapse of a predetermined time, the transmitting terminal device may send the request for the state information to the second terminal device again. For example, when the transmitting terminal device receives information on a schedule in which two hours are required, the transmitting terminal device may request the second terminal device to transmit the state information after two hours. Alternatively, the transmitting terminal device may send the request for the state information to the second terminal device after elapse of a prescribed time. The transmitting terminal device may determine whether to transmit data based on the received state information. If it is determined that the data transmission is impossible, the transmitting terminal device may hold the data transmission again.

If the transmitting terminal device determines that the data transmission is possible, the transmitting terminal device can transmit data [S1640]. FIG. 16 shows an embodiment in which a transmitting terminal device receives state information, determines whether a second terminal device can receive data, and then determine whether to transmit data.

Figure 17:
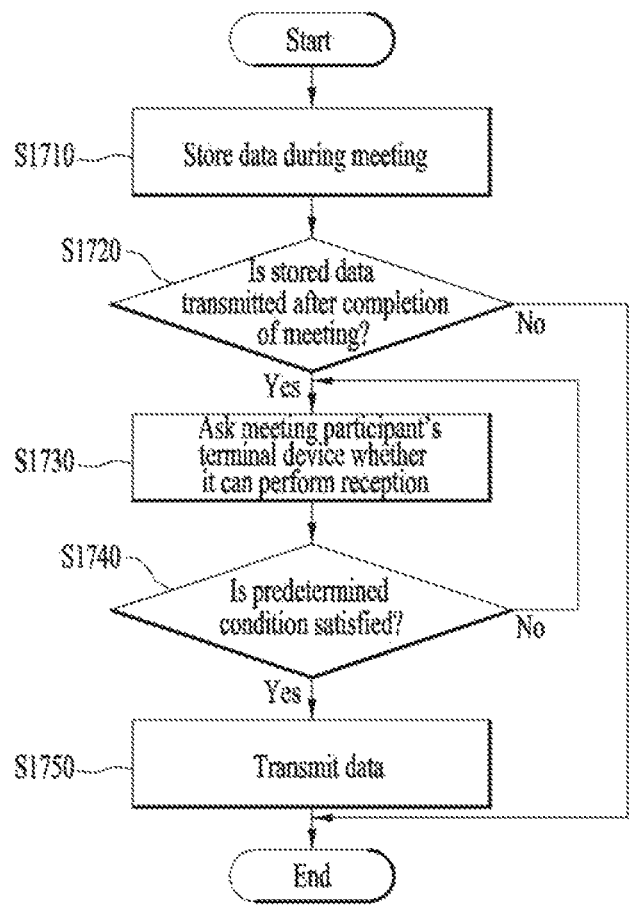
FIG. 17 is a diagram illustrating a process for transmitting materials for a meeting to a meeting participant according to an embodiment of the present invention.

FIG. 17 is a diagram illustrating a process for transmitting materials for a meeting to a meeting participant according to an embodiment of the present invention.

Referring to FIG. 17, a user's terminal device can store data during a meeting [S1710]. For example, the user's terminal device may record a voice, take a photograph, or store a memo. If the terminal device determines that the meeting is completed, the terminal device can ask the user whether to transmit the stored data [S1720]. For example, if a meeting time included in schedule information is elapsed, the terminal device may determine that the meeting is completed. Alternatively, if it is determined based on position information that the user leaves a meeting room, the terminal device may determine that the meeting is completed. Further, the terminal device may determine that the meeting is completed by considering the schedule information and the position information together.

If the user determines not to transmit the data, the user's terminal device may enter a standby mode. On the contrary, if the user desires to transmit the data, the terminal device can ask a meeting participant's terminal device whether it can receive the data [S1730]. For example, the user's terminal device may send a request for identification information to a terminal device located within a prescribed distance during the meeting and then receive the requested identification information. By doing so, the user's terminal device may recognize a meeting participant. Alternatively, the user's terminal device may recognize meeting participants based on a list of meeting participants input by the user. When receiving the request from the user's terminal device, the meeting participant's terminal device may extract its state information and then determine whether it can receive the data. Thereafter, the meeting participant's terminal device may transmit, to the user's terminal device, information on whether it can receive the data.

The user's terminal device can determine whether a predetermined condition is satisfied [S1740]. When all meeting participants' terminal devices can perform data reception, the user's terminal device may transmit the data. Alternatively, when more than half of all meeting participants' terminal devices can perform data reception, the user's terminal device may transmit the data. Alternatively, the user's terminal device may configure a data transmission condition to transmit the data to each meeting participant's terminal device. The terminal device can transmit the data according to the predetermined condition [S1750]. The user may configure various data transmission conditions.

Figure 18:
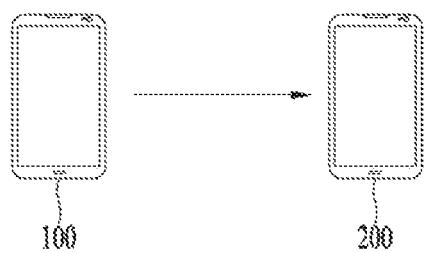
FIG. 18 is a diagram illustrating a process for transmitting data to a terminal device according to an embodiment of the present invention.

FIG. 18 is a diagram illustrating a process for transmitting data to a terminal device according to an embodiment of the present invention.

FIG. 18 illustrates that a first terminal device 100 transmits and receives data to and from a second terminal device 200 based on state information. In the case, a large amount of data may be transmitted. In an embodiment, the first terminal device 100 or the second terminal device 200 may not be connected to a Wi-Fi network. Alternatively, a data size may be greater than available reception capacity. Since each of the first and second terminal devices 100 and 200 extracts state information using an IA and determines whether to transmit data based on the extracted state information, each of them can perform an optimal data transmission process.

When the first terminal device 100 intends to transmit data to the second terminal device 200, the first terminal device 100 may ask the second terminal device 200 whether the second terminal device 200 can receive the data. In this case, the second terminal device 200 may determine whether it can receive the data by extracting its state information. For example, the state information, which is determined for the data reception, may include a communication network connection state (e.g., data network connection state, Wi-Fi connection state, etc.), a battery state, the amount of data that can be received, a memory capacity, information on whether the second terminal is calling, schedule information, position information, and the like. Meanwhile, the first terminal device 100 may transmit information on the data to be transmitted. For example, data information may include information on the amount and type of data.

The second terminal device 200 may transmit, to the first terminal device 100, its data reception capability. When the first terminal device 100 determines that second terminal device 200 can receive the data based on the response from the second terminal device 200, the first terminal device 100 can transmit the data to the second terminal device 200.

Alternatively, the first terminal device 100 may request the state information to the second terminal device 200 and then receive the state information. When receiving the data transmission request from the transmitting terminal device, the second terminal device 200 may extract and transmit its state information. Using the received state information, the first terminal device 100 may determine whether the second terminal device 200 can perform data reception. If it is determined that the second terminal device 200 can perform the data reception, the first terminal device 100 may transmit the data to the second terminal device 200.

Figure 19:
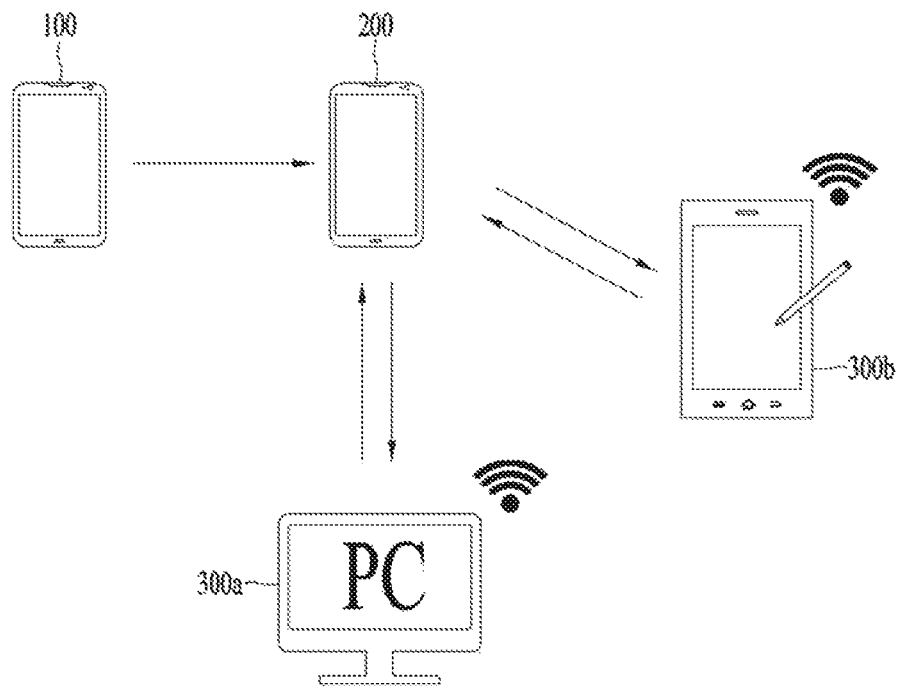
FIG. 19 is a diagram illustrating a process for searching for a receiving terminal device according to an embodiment of the present invention.

FIG. 19 is a diagram illustrating a process for searching for a receiving terminal device according to an embodiment of the present invention.

FIG. 19 illustrates a transmitting terminal device 100 and a receiving terminal device 200. To transmit data, the transmitting terminal device 100 may ask the receiving terminal device 200 whether the receiving terminal device 200 can perform data reception. The receiving terminal device 200 may extract state information and then determine whether it can perform the data reception. For example, if the receiving terminal device 200 has insufficient data capacity or if the receiving terminal device 200 is not connected to a free W-Fi network so that it does not have sufficient data reception capacity, the receiving terminal device 200 may ask a different neighboring terminal device whether it can perform the data reception. For example, the different neighboring terminal device may include a PC 300a, a table PC 300b, etc., which are connected to a short-range communication network. Each of the PC 300a and table PC 300b may extract its state information and then determine whether it can perform the data reception. Thereafter, each of the PC 300a and table PC 300b may transmit a response on the data reception capability to the receiving terminal device 200.

The receiving terminal device 200 may select one of the different terminal devices 300a and 300b which can perform the reception and then transmit information on the selected terminal device to the transmitting terminal device 100. The transmitting terminal device 100 may transmit the data to the selected terminal device. Alternatively, the receiving terminal device 200 may transmit information on a list of the different terminal devices 300a and 300b which can perform the reception to the transmitting terminal device 100. The transmitting terminal device 100 may select one of the different terminal devices 300a and 300b and then transmit the data to the selected one.

Figure 20:
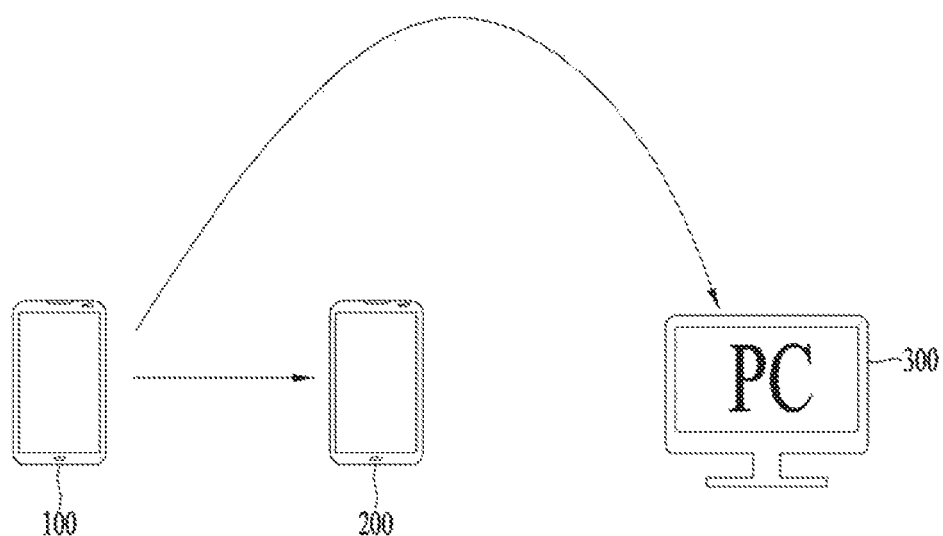
FIG. 20 is a diagram illustrating a process for transmitting data to a terminal device according to another embodiment of the present invention.

FIG. 20 is a diagram illustrating a process for transmitting data to a terminal device according to another embodiment of the present invention.

FIG. 20 illustrates that a transmitting terminal device 100 transmits data to a second terminal device 300. As described above, when the transmitting terminal device 100 asks a receiving terminal device 200 whether the receiving terminal device 200 can perform data reception, the receiving terminal device 200 may extract state information and then determine its data reception capability. When the receiving terminal device 200 determines that its data reception is impossible, the receiving terminal device 200 may ask a neighboring terminal device whether it can perform the data reception. The neighboring terminal device may determine whether it can perform the data reception by extracting its state information and then transmits information on its data reception capability to the receiving terminal device 200. If a plurality of terminal devices can perform the data reception, the receiving terminal device 200 may select a single terminal device from the plurality of terminal devices and then transmit information on the selected terminal device to the transmitting terminal device 100. Alternatively, the receiving terminal device 200 may transmit a list of the plurality of terminal devices that can perform the data reception and information thereon to the transmitting terminal device 100, and the transmitting terminal device 100 may select one of them.

In this case, the second terminal device 300 may be selected so as to receive the data instead of the receiving terminal device 200. The transmitting terminal device 100 may transmit the data to the second terminal device 300 based on the received information on the second terminal device 300.

Hereinabove, various embodiments in which a terminal device selects a connection method or transmits data based on extracted state information have been described. Now, a description will be given of a method for controlling the terminal device with reference to the accompanying flowchart.

Figure 21:
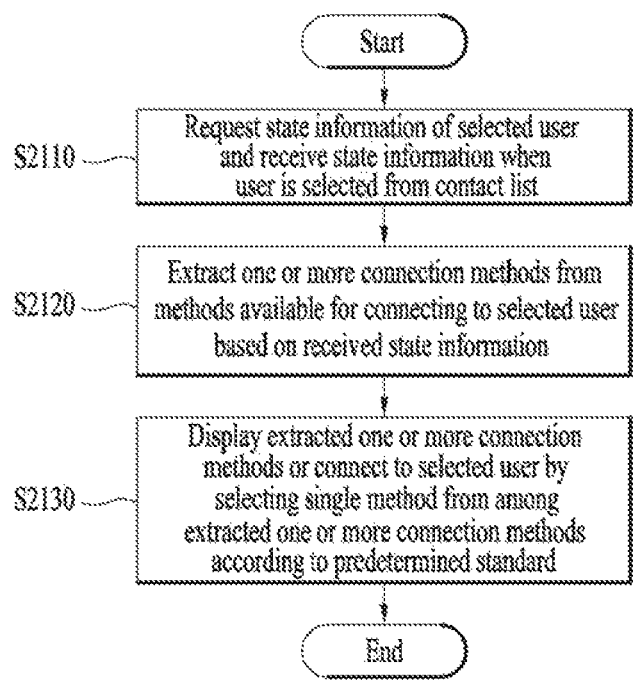
FIG. 21 is a flowchart of a method for controlling a terminal device according to an embodiment of the present invention.

FIG. 21 is a flowchart of a method for controlling a terminal device according to an embodiment of the present invention.

Referring to FIG. 21, when a user is selected from a contact list, a terminal device can request state information of the selected user and then receive the requested state information [S2110]. In this case, the user may be selected not only from the contact list, but also through a shortcut button, a shortcut icon, or a link area included in a message. The state information may include information on at least one of a location, a movement, a surrounding noise, and a schedule of the selected user.

The terminal device can extract one or more connection methods from methods available for connecting to the selected user based on the received state information [S2120]. Specifically, the terminal device may extract the available connection methods based on the received state information and stored connection method. The methods available for connecting to the selected user may include voice call connection to a home phone, video call connection to the home phone, message transmission to the home phone, voice call connection to a work phone, video call connection to the work phone, message transmission to the work phone, voice call connection to a personal terminal device, video call connection to the personal terminal device, and message transmission to the personal terminal device.

The terminal device may display the extracted one or more connection methods. Alternatively, the terminal device can select a method from the extracted one or more connection methods according to a predetermined standard and then make connection with the selected user using the selected method [S2130].

Among all methods available for connecting to the selected user, the terminal device may activate and display the extracted available connection methods and deactivate and display the remaining connection methods. Alternatively, the terminal device may display the extracted one or more connection methods. In addition, when connecting to the selected user using the selected method, the terminal device may display a menu for switching to other extracted connection methods.

The above-described invention can be implemented in a program-recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy disks, optical data storage devices, and the like, for example and also include carrier-wave type implementations (e.g., transmission via Internet). Further, the computer may include the control unit 180 of the terminal device. Therefore, the above-mentioned embodiments are to be construed in all aspects as illustrative and not restrictive. The scope of the present invention should be determined by reasonable interpretation of the appended claims. In addition, the present invention covers the modifications and variations of this invention that come within the scope of the appended claims and their equivalents.

What is claimed is:

1. A terminal device, comprising:
a display configured to display a contact list;
a communication unit configured to request and receive state information of a user selected from the contact list; and
a controller operably coupled with the display and the communication unit and configured to:
control the communication unit to request and receive the state information in response to the selection of the user;
extract at least one of a plurality of methods available for connecting to the selected user based on the received state information;
control the display to display the extracted at least one connection method;
select one of the extracted at least one connection method based on predetermined criteria; and
control the communication unit to connect to the selected user using the selected connection method.

2. The terminal device of claim 1, wherein the state information comprises information on at least one of a location, a movement, a surrounding noise, or a schedule of the selected user.

3. The terminal device of claim 1, wherein the selected connection method comprises at least one of voice call connection to a home phone, voice call connection to a work phone, voice call connection to a personal terminal device, video call connection to the personal terminal device, or message transmission to the personal terminal device.

4. The terminal device of claim 1, wherein the controller is further configured to control the display to display the extracted at least one connection method only.

5. The terminal device of claim 1, wherein the controller is further configured to:
  activate the extracted at least one connection method among the plurality of methods;
  control the display to display the activated at least one connection method;
  deactivate the rest of the plurality of methods except the activated at least one connection method; and
  control the display to display the rest of the plurality of methods.

6. The terminal device of claim 1, wherein when connecting to the selected user using the selected connection method, the controller is further configured to control the display to display a menu for switching to another extracted at least one connection method.

7. The terminal device of claim 1, wherein the controller is further configured to:
  receive state information of each user included in a group in response selection of the group from the contact list;
  extract at least one connection method based on the received state information of each user included in the selected group; and
  control the display to display the at least one connection method extracted based on the received state information of each user.

8. A control method for a terminal device, the method comprising:
  displaying a contact list;
  when a user is selected from the contact list, requesting state information of the selected user;
  receiving the requested state information;
  extracting at least one of a plurality of methods available for connecting to the selected user based on the received state information;
  displaying the extracted at least one connection method;
  selecting one of the extracted at least one connection method based on predetermined criteria; and
  connecting to the selected user using the selected connection method.

9. The method of claim 8, wherein the state information comprises information on at least one of a location, a movement, a surrounding noise, or a schedule of the selected user.

10. The method of claim 8, wherein the selected connection method comprises at least one of voice call connection to a home phone, voice call connection to a work phone, voice call connection to a personal terminal device, video call connection to the personal terminal device, or message transmission to the personal terminal device.

11. The method of claim 8, wherein the displaying the extracted at least one connection method comprises:
  activating the extracted at least one connection method among the plurality of methods;
  displaying the activated at least one connection method;
  deactivating the rest of the plurality of methods except the activated at least one connection method; and
  displaying the rest of the plurality of methods.

12. The method of claim 8, wherein the displaying the extracted at least one connection method comprises, when the selected user is connected using the selected connection method, displaying a menu for switching to another extracted at least one connection method.

13. The method of claim 8, wherein the requesting state information comprises, when a group included in the contact list is selected, receiving state information of each user included in the selected group,
  wherein the extracting at least one connection method comprises extracting the at least one connection method based on the received state information of each user included in the selected group, and
  wherein the displaying the extracted at least one connection method comprises displaying the extracted at least one connection method.

14. An intelligent agent system, comprising:
  a first terminal device configured to, when a user is selected from a contact list, transmit a request for state information of the selected user; and
  a second terminal device configured to extract the state information according to the request from the first terminal device and transmit the extracted state information to the first terminal device,
  wherein the first terminal device is further configured to:
    receive the state information from the second terminal device;
    extract at least one of a plurality of methods available for connecting to the selected user based on the received state information;
    display the extracted at least one connection method;
    select one of the extracted at least one connection method based on predetermined criteria; and
    connect to the selected user using the selected connection method.

15. The system of claim 14, wherein the state information comprises information on at least one of a location, a movement, a surrounding noise, or a schedule of the selected user.

16. The system of claim 14, wherein the selected connection method includes at least one of voice call connection to a home phone, voice call connection to a work phone, voice call connection to a personal terminal device, video call connection to the personal terminal device, or message transmission to the personal terminal device.

17. The system of claim 14, wherein the first terminal device is configured to display the extracted at least one connection method only.

18. The system of claim 14, wherein the first terminal device is further configured to:
  activate the extracted at least one connection method among the plurality of methods;
  display the activated at least one connection method;
  deactivate the rest of the plurality of methods except the activated at least one connection method; and
  display the rest of the plurality of methods.

19. The system of claim 14, wherein when connecting to the selected user using the selected connection method, the first terminal device is further configured to display a menu for switching to another extracted at least one connection method.

20. The system of claim 14, wherein the first terminal device is further configured to:
  when a group included in the contact list is selected, receive state information of each user included in the selected group;
  extract at least one connection method based on the received state information of each user included in the selected group; and
  display the extracted at least one connection method.

* * * * *